United States Patent
Tanoue

(10) Patent No.: US 7,991,975 B2
(45) Date of Patent: Aug. 2, 2011

(54) STORAGE MEDIUM CONTROL UNIT, DATA STORAGE DEVICE, DATA STORAGE SYSTEM, METHOD, AND CONTROL PROGRAM

(75) Inventor: Kazunori Tanoue, Tokyo (JP)

(73) Assignee: NEC Corporation, Tokyo (JP)

(*) Notice: Subject to any disclaimer, the term of this patent is extended or adjusted under 35 U.S.C. 154(b) by 666 days.

(21) Appl. No.: 12/053,955

(22) Filed: Mar. 24, 2008

(65) Prior Publication Data
US 2008/0282031 A1 Nov. 13, 2008

(30) Foreign Application Priority Data
Mar. 30, 2007 (JP) ................................. 2007-095169

(51) Int. Cl.
*G06F 12/00* (2006.01)
(52) U.S. Cl. ................. 711/167; 711/E12.075
(58) Field of Classification Search ........................ None
See application file for complete search history.

(56) References Cited

U.S. PATENT DOCUMENTS

| 6,311,256 | B2 * | 10/2001 | Halligan et al. | 711/158 |
| 7,644,204 | B2 * | 1/2010 | Marripudi et al. | 710/40 |
| 2004/0230742 | A1 * | 11/2004 | Ikeuchi et al. | 711/112 |
| 2007/0011360 | A1 * | 1/2007 | Chang et al. | 710/5 |

FOREIGN PATENT DOCUMENTS

| JP | 06-161934 | 6/1994 |
| JP | 08-055055 | 2/1996 |
| JP | 10-240449 | 9/1998 |
| JP | 10-289189 | 10/1998 |
| JP | HEI-11-85661 | 3/1999 |
| JP | 2000-56932 | 2/2000 |
| JP | 2000-181853 | 6/2000 |
| JP | 2002-023962 | 1/2002 |
| JP | 2004-102440 | 4/2004 |

* cited by examiner

*Primary Examiner* — Reginald G Bragdon
*Assistant Examiner* — Aracelis Ruiz
(74) *Attorney, Agent, or Firm* — Scully, Scott, Murphy & Presser, P.C.

(57) ABSTRACT

To prevent random access commands from remaining even in the case of mixed sequential and random accesses. A storage medium control unit is used in a data storage device adapted to perform processing on a data storage medium based on multiple requests including sequential access requests and random access requests. The storage medium control unit includes: request response delay monitoring device for monitoring the presence of delay in response to the requests based on whether or not the response time for each request exceeds a certain allowable delay time; and request control device for preventing the rearrangement processing of the sequential access requests and controlling the processing of the requests to be performed in a certain request order at the allowable delay time if exceeded.

26 Claims, 8 Drawing Sheets

STORAGE MEDIUM CONTROL UNIT, DATA STORAGE DEVICE, DATA STORAGE SYSTEM, METHOD, AND CONTROL PROGRAM

CROSS-REFERENCE TO RELATED APPLICATION

This application is based upon and claims the benefit of priority from Japanese patent application No. 2007-095169, filed on Mar. 30, 2007, the disclosure of which is incorporated herein in its entirety by reference.

BACKGROUND OF THE INVENTION

1. Field of the Invention

The present invention relates to a storage medium control unit, data storage device, data storage system, control method for data storage device, and control program for data storage device, specifically including HDD response control for mixed sequential and random accesses.

2. Description of the Related Art

RAID (Redundant Array of Inexpensive Disks), which is for use in disk array devices, means a system for dividing and reading/writing data parallel from/into multiple HDDs (Hard Disk Drives). RAID systems employ various measures in data reading and writing, such as striping and mirroring, for an increase in speed, reliability, and fault-tolerance.

The following Patent Documents 1 to 3, for example, disclose techniques related to such disk array devices.

Japanese Published Unexamined Patent Application No. 2000-56932 (Patent Document 1) discloses a disk control unit. The disk control unit is adapted to rearrange requests within a specific allowable delay time for each request and to issue the requests for disk drives. For reducing seek distance, the rearrangement control section in the disk control unit receives and inserts each request into any position in the request queue, which is managed by the request management section, based on information given by the delay time management section and the access time management section (see Paragraph 0073).

The rearrangement control section of Patent Document 1 further scans the request table sequentially from the end of the queue and searches whether or not there is a request R (i) of the same type as the request R (x) and having a logical address "a" preceding or following the logical address "a (x)" by one block (see Paragraph 0095 and Step S204 in FIG. 10), and if such a request R (i) is found, inserts the request R (x) temporarily into the position immediately preceding or following the request R (i) and sets the access type of the request R (x) to "consecutive" (see Paragraph 0096 and Steps S206 and S207 in FIG. 10).

If no such a request R (i) is found and the logical address "a (x)" of the request R (x) to be inserted is within the range covered by the logical addresses "a" of all the requests R, R (x) is inserted temporarily into a position not to disorder the logical addresses "a" (i.e. in ascending or descending order) and then the access type "type (x)" of the request R (X) is set to "independent" (see Paragraph 0098 and Step S212 in FIG. 10). Further, if the logical address "a (x)" of the request R (x) to be inserted is not within the range covered by the logical addresses "a" of the requests R, the request R (x) is inserted temporarily into the end of the queue and then the access type "type (x)" of the request R (x) is set to "independent" (see Paragraph 0098 and Step S213 in FIG. 10). In this case, the disable flag "flag" of the request R at the end or the position immediately preceding the insert position is turned ON (no request can be inserted additionally preceding the request R).

When the request R (x) is inserted temporarily into the queue, it is also determined whether or not the estimated finishing time of the request R (x), "e (x)", and the estimated finishing time of the request R (X+n) following the request R (x), "e (x+n)", that are newly calculated in consideration of access time, are within the finishing time of the request R (x), "f (x)", and the finishing time of the request R (x+n), "f (x+n)", that are calculated by adding allowable delay time "delay (x)" to the current time, respectively (see Paragraph 0105 and Step S215 in FIG. 10). If all the estimated finishing times are within the corresponding finishing times, the temporary insert position of the request R (x) is defined as a definite insert position to complete the rearrangement processing.

On the contrary, if not all the estimated finishing times are within the corresponding finishing times, the temporary insert position is determined to be inappropriate and the change in the estimated finishing time "e" of each request R that has heretofore been made is restored to a state before the temporary insertion processing. Further, the request R (x) is inserted into the end of the queue and then the access type "type (x)" of the request R (x) is set to "independent" to complete the rearrangement processing (see Paragraph 0105 and Step S216 in FIG. 10).

Japanese Published Unexamined Patent Application No. 2004-102440 (Patent Document 2) discloses sequential read/write processing from/into storage media. The sequential processing includes: a comparison step of using a sequential processing completion sector for indicating a sector in which the sequential processing is completed and a sequential processing maximum extension sector for indicating a limit to which the sequential processing can be extended to compare the initial sector of a read/write command received during the sequential processing with the sequential processing completion sector and with the sequential processing maximum extension sector if the received command is not a sequential access; and a processing step of queueing the received read/write command in the command queue to continue the sequential processing if the initial sector on the storage medium precedes the sequential processing completion sector or follows the sequential processing maximum extension sector as a result of the comparison.

The command processing section is adapted to analyze commands received from a host device and to instruct the host transfer processing section and the disk control section to process and execute the commands. In the execution of read/write commands, the command mode such as random access or sequential access and the command queueing state in the command queue are analyzed to instruct the disk control section to perform read/write processing. Commands analyzed not to be executed or executable immediately in the command processing section are queued temporarily in the command queue. Queueing commands in the command queue allow the command processing section to change the execution order of the commands (see Paragraph 0018). The main purpose of this technique is, when a group of sequential commands are issued from a host device, allowing for a significant improvement in the command processing speed without stopping the sequential processing even if commands may be issued from another host device (see Paragraph 0008).

In Japanese Published Unexamined Patent Application No. Hei-11-85661 (Patent Document 3), the hard disk drive includes: a control processor for controlling the entire hard disk drive; a disk interface control section for controlling a disk interface for the connection with a disk control unit; a memory for storing and caching various information; a disk control section for controlling a disk; and a disk for storing actual data. The memory has: a command processing program to be executed on the control processor; a cache area for storing and caching data; a command management table for managing commands received from the disk control unit; a command queue for storing queuing commands; command queue management information for managing the number of commands registered in the command queue; a sequential read command management table for managing the processing state of sequential read commands; and a re-registration queue for re-registering commands in the command queue (see Paragraph 0018).

Sequential read commands are executed based on the sequential read command management table, and read processing is repeated by the number of times specified by the commands. Commands are registered again in the command queue for each completion of read processing. If the command queue is full, commands are registered in the re-registration queue (see Paragraph 0019). The format of the command queue includes a command field for indicating the command type such as read or write (see Paragraph 0022 and FIG. 3).

Meanwhile, for the case of mixed random read and sequential read, hard disk drives are adapted to rearrange the execution order of commands so as to give priority to sequential read. Consequently, the rearrangement of commands in hard disk drives causes random read to be carried out after sequential read, resulting in a problem of delayed random read response.

Also in hard disk control, the rearrangement of commands in hard disk drives is useful to increase the operation speed of the hard disk drives, but suffers from a problem of delayed random access response. It is thus difficult for RAID controllers for controlling hard disk drives to prevent such a rearrangement.

In Patent Document 1, the rearrangement control section is adapted to position a request R (x) exceeding its estimated finishing time at the end of the queue, which results in a problem of delayed processing of the request R (x). That is, there is a problem in that requests exceeding their finishing time remain in the queue. In addition, the rearrangement control section performs rearrangement processing, which results in a problem of delayed random read response.

In Patent Document 2, when a group of sequential commands are issued from a host device, the sequential processing cannot be stopped if commands may be issued from another host device, which results in a problem of delayed random read response, too.

Patent Document 2 also discloses queueing all non-sequential commands, if received during sequential processing, as random commands until the sequential processing is completed (see Paragraph 0006), resulting in a problem in that random commands continue to remain until the sequential processing is completed.

Patent Document 3 discloses a technique only for processing by sequential read commands, and there is no consideration about random read response delay.

SUMMARY OF THE INVENTION

The present invention has been made to solve the above-described technical problems, and an exemplary object thereof is to provide a storage medium control unit, data storage device, data storage system, control method for data storage device, and control program for data storage device that can prevent random read commands from remaining and thereby increase the processing speed even in an environment of mixed sequential and random read commands.

The present invention is directed to a storage medium control unit for use in a data storage device adapted to perform processing on a data storage medium with data stored therein based on multiple requests including sequential access requests and random access requests, the control unit including request response delay monitoring device and request control device. The request response delay monitoring device is adapted to monitor the presence of delay in response to requests based on whether or not the response time for each request exceeds a certain allowable delay time. And when the response time is determined to exceed the certain allowable delay time based on a result of monitoring the presence of delay in response obtained in a request response delay monitoring device, the request control device prevents the rearrangement processing of the sequential access requests that are given priority over the random access requests, and controls the processing of the requests to be performed in a certain request order at the point when the response time exceeds the certain allowable delay time.

A control method for a data storage device including at least one HDD according to another exemplary aspect of the invention includes a command response delay monitoring step and a command issue control step. The command response delay monitoring step is adapted to monitor the presence of delay in response to command information for the HDD based on whether or not the response time to the command information exceeds an allowable delay time for the HDD. The command issue control step is adapted to newly issue an initial command defining a certain order after passing the allowable delay time for the HDD, based on a result of monitoring the presence of delay in response obtained in a command response delay monitoring step, to control the HDD.

A control program according to still another exemplary aspect of the invention is a program for controlling a data storage device including at least one HDD, and the program is adapted to cause a computer to function as command response delay monitoring device and command issue control device. The command response delay monitoring device is adapted to monitor the presence of delay in response to command information for the HDD based on whether or not the response time to the command information exceeds an allowable delay time for the HDD. The command issue control device is adapted to newly issue an initial command defining a certain order after passing the allowable delay time, based on a result of monitoring the presence of delay in response obtained at a command response delay monitoring device, to control the HDD.

DETAILED DESCRIPTION OF THE EXEMPLARY EMBODIMENTS

Figure 1:
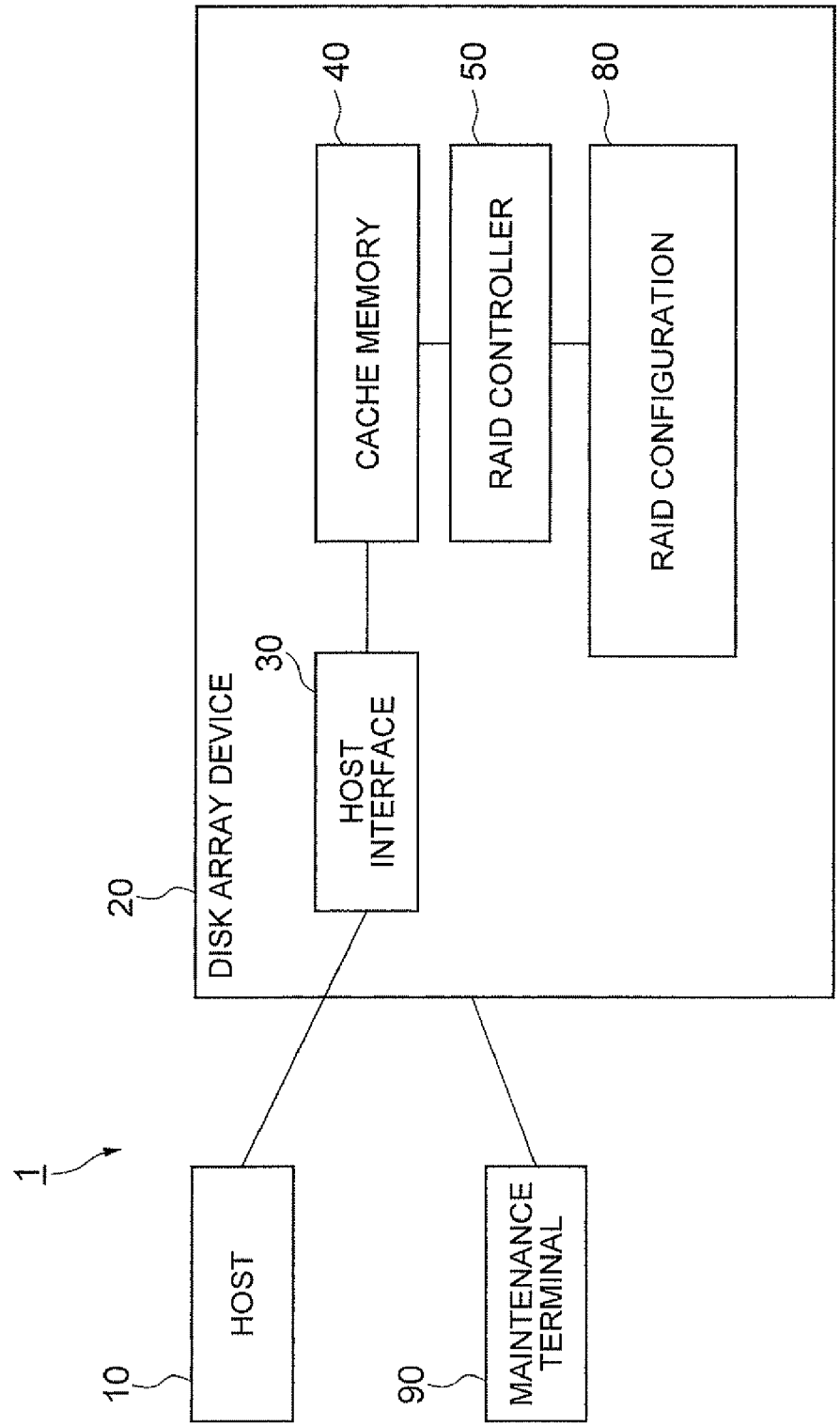
FIG. 1 is a block diagram showing an example of the overall configuration of a data storage system according to a first exemplary embodiment of the invention.

In addition, exemplary embodiments to be described hereinafter do not unduly limit the scope of the present invention as described in the scope of claims. Also, all of the arrangements to be described in the exemplary embodiments are not necessarily the features indispensable to the present invention.

One exemplary embodiment of the present invention will hereinafter be described specifically with reference to the accompanying drawings.

First Exemplary Embodiment

First, a storage medium control unit (denoted by the reference numeral 50, for example) characterizing the exemplary embodiment is used in a data storage device adapted to perform processing on a data storage medium with data stored therein based on a group of requests including sequential access requests and random access requests. The storage medium control unit includes: request response delay monitoring device (denoted by the reference numeral 51, for example) for monitoring the presence of delay in response to requests; and request control device (configured by the combination of the references numerals 58 and 62, for example) for preventing the rearrangement processing of the sequential access requests that are given priority over the random access requests when the response time exceeds the certain allowable delay time, and controlling the processing of the requests so as to be performed in a certain request order at the point when the response time exceeds the certain allowable delay time based on a result of monitoring the presence of delay in response obtained in a request response delay monitoring device.

In addition, the exemplary embodiment describes the case of employing command response time monitoring device 51 for monitoring response time to HDD commands (requests) as an example of the "request response delay monitoring device."

(Overall Configuration of the Data Storage System)

Prior to the description of such characteristic arrangements, the overall configuration of a data storage system according to the exemplary embodiment will be described with reference to FIG. 1. FIG. 1 is a block diagram schematically showing an example of the overall configuration of a data storage system according to the exemplary embodiment.

The data storage system 1 according to the exemplary embodiment is adapted to prevent the rearrangement of requests (sequential read commands) for a data storage medium, including as shown in FIG. 1: a host computer 10; a disk array device 20 as one aspect of a data storage device made to communicate with the host computer 10 via a network to store data from the host computer 10 into the data storage medium; and a maintenance terminal 90 made to communicate with the disk array device 20 via the network to maintain and manage the disk array device 20.

The host computer 10 is adapted to send read commands (requests) and write commands (requests), etc., to the disk array device 20. The maintenance terminal 90 is adapted to change and display the settings of the disk array device 20.

In addition, the hardware configurations of the host computer 10 and the maintenance terminal 90 each include: display device (e.g. screen) for displaying various information and the like; manipulative input device (e.g. keyboard, mouse) for manipulatively inputting data (to various entry fields and the like) on the display of the display device; sending and receiving device (communication device) for sending and receiving various signals and data; storage device (e.g. memory, hard disk) for storing various programs and data; and control device (e.g. CPU) for controlling these components, though not shown in the drawings.

The host computer 10 and the maintenance terminal 90 are also adapted to operate under program control, and each may be any computer such as a desktop, laptop computer, other information piece of equipment having a wireless/wired communication function, and the like as long a shaving network related functions regardless of whether portable or fixed.

As shown in FIG. 1, the disk array device 20 includes a host interface 30, a cache memory 40, a RAID controller 50, and a RAID configuration 80 and the like.

The RAID controller 50 is a RAID control unit used in the disk array device 20 that includes the RAID configuration 80 including at least one HDD and is adapted to control the RAID configuration 80.

Figure 2:
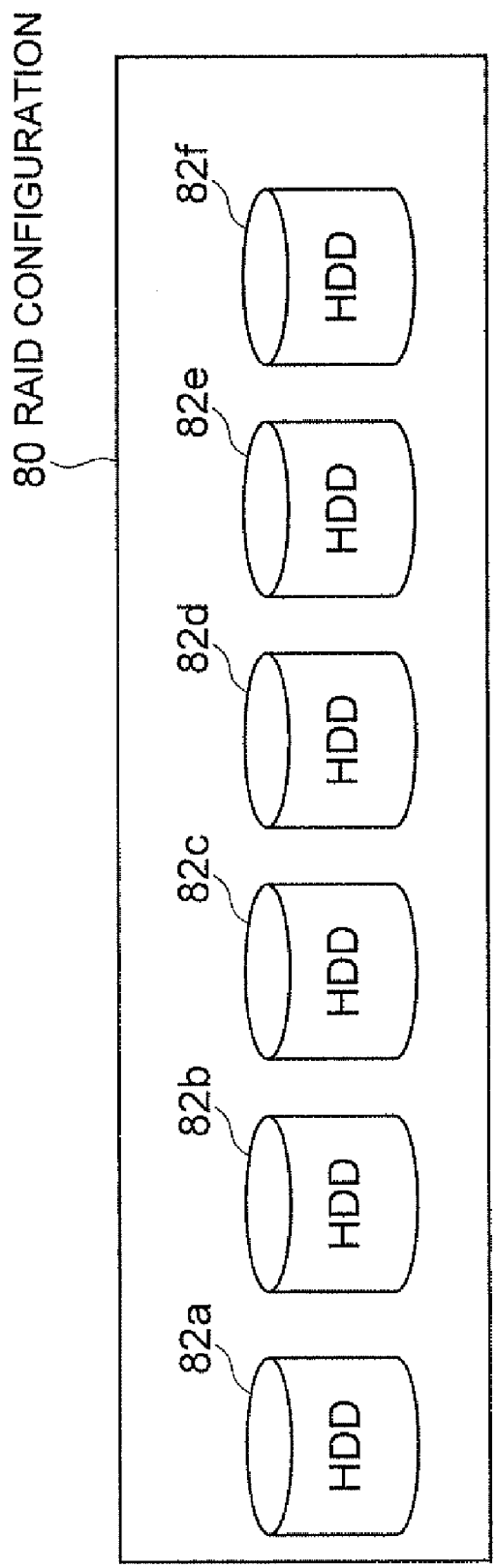
FIG. 2 is a block diagram showing an example of a RAID configuration in a disk array device in the data storage system of FIG. 1.

The RAID configuration 80 (first configuration) has at least one HOD (e.g. SCSI disk drive) as a data storage medium, and for example, is composed of six or more HDDs including HDDs 82a, 82b, 82c, 82d, 82e, and 82f as shown in FIG. 2. FIG. 2 is a block diagram showing an example of the RAID configuration in the disk array device of FIG. 1 as an example of a data storage device. In the RAID configuration 80, the HDDs 82a, 82b, 82c, 82d, 82e, and 82f form RAID6 to achieve a 2HDD configuration.

In the RAID configuration 80 of 2HDD, even if reading from two HDDs may be impossible, reading from other HDDs allows data to be generated. Also, in the case of RAID1, RAID4, or RAID5, even if reading from one HDD may be impossible in the RAID configuration 80, reading from other HDDs allows data to be generated.

The disk array device 20 is adapted to receive read commands and write commands from the host computer 10 and to read and write data from/into the HDDs 82a, 82b, 82c, 82d, 82e, and 82f included in the RAID configuration 80.

The host interface 30 is adapted to receive read commands and write commands from the host computer 10. The cache memory 40 is adapted to cache data received from or sent to the host computer 10.

The host interface 30 is also adapted to send requested data, if it exists in the cache memory 40, to the host computer 10 when a read command is received from the host computer 10. On the other hand, the host interface 30 is adapted to require the RAID controller 50 to read data from the RAID configuration 80, if the requested data does not exist in the cache memory 40, and to send the requested data obtained via the RAID controller 50 to the host computer 10.

The host interface 30 is further adapted to write requested data into the cache memory 40 and then return a response to the host computer 10 when a write command is received from the host computer 10. When written into the cache memory 40, the RAID controller 50 then starts writing into the RAID configuration 80.

(Detailed Configuration of the Disk Array Device)

Figure 3:
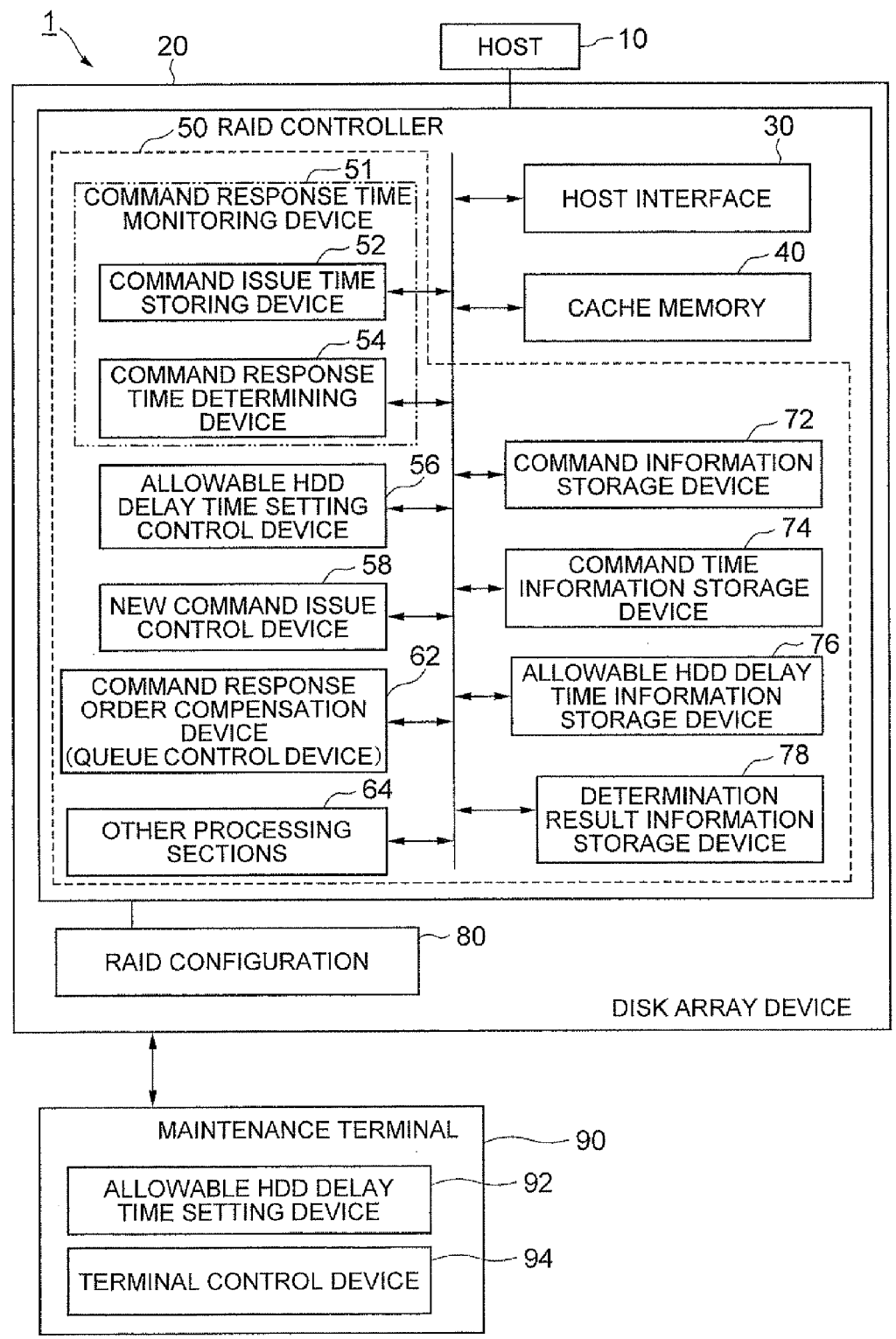
FIG. 3 is a block diagram showing an example of a more detailed configuration of the disk array device in the data storage system of FIG. 1.

Next will be described a more detailed configuration of the disk array device 20 characterizing the exemplary embodiment with reference to FIG. 3. FIG. 3 is a block diagram showing an example of a more detailed configuration of the disk array device in the data storage system of FIG. 1.

For the case of mixed random read (random access requests) and sequential read (sequential access requests) accesses HDDs and therefore delay in response to random read for the HDDs due to rearrangement of HDD commands, the disk array device 20 according to the exemplary embodiment has a function capable of monitoring delay time and keeping random read delay time within an allowable range defined by the system.

In order to realize this function, the RAID controller 50 as a RAID control unit, an example of the storage medium control unit, includes command response time monitoring device 51 (command response delay monitoring device), allowable HDD delay time setting control device 56, new command issue control device 58, command response order compensation device 62 (queue control device), other processing sections 64, command information storage device 72, command time information storage device 74, allowable HDD delay time information storage device 76, and determination result information storage device 78, as shown in FIG. 3.

Further, the command response time monitoring device 51 in the RAID controller 50 includes command issue time storing device 52 and command response time determining device 54.

The maintenance terminal 90 includes: allowable HOD delay time setting device 92 for setting an allowable delay time for at least one HDD in the RAID configuration 80; and terminal control device 94 having functions of controlling other components such as a control function of sending setting information set by the allowable HDD delay time setting device 92 to the disk array device 20 via communication device not shown in the drawings.

In addition, if the RAID configuration 80 includes only one HDD for example, the allowable HDD delay time setting device 92 can set an allowable HDD delay time for the HDD. Also, if the RAID configuration includes N HDDs (N is a natural number of 1 or more), first to Nth allowable HDD delay time setting sections may be provided so that first to Nth allowable HDD delay times can be set for the respective N HDDs.

In addition, the blocks (denoted by the references numerals 51, 52, 54, 56, 58, 62, and 64, for example) in the RAID controller 50 of the block diagram shown in FIG. 3 are software modules functionalized by various programs that are stored in appropriate memories when the computer executes the programs. That is, the physical configuration may include, for example, one or more CPUs (or one or more CPUs and one or more memories), but the software modules corresponding to the respective devices are obtained by representing multiple functions that the CPUs exert under program control as components by the respective devices. In the case of functionally expressing a dynamic state where the CPUs operate under program control (i.e. program steps are executed), the CPUs include such devices. In a static state where no program is executed, entire programs providing the respective devices (or program components included in the respective devices) are stored in a storage area such as a memory. It will be considered that the following descriptions of each device may be taken as describing a computer functionalized by programs together with the functions of the programs or may be taken as describing a device composed of multiple electronic circuit blocks that are functionalized permanently by their specific hardware. Therefore, these function blocks may be achieved in various ways such as only by hardware, only by software, and by the combination thereof, and it is not to be limited to one of them.

That is, the command response time monitoring device 51 including the command issue time storing device 52 and the command response time determining device 54, allowable HDD delay time setting control device 56, new command issue control device 56, command response order compensation device 62 (queue control device), other processing sections 64, command information storage device 72, command time information storage device 74, allowable HDD delay time information storage device 76, and determination result information storage device 78, etc., may be achieved as, for example, programs in a computer in the RAID controller 50.

The command response time monitoring device 51 is adapted to monitor response time to commands for HDDs in the RAID configuration 80.

The command issue time storing device 52 is adapted to store the issue time of a command for an HDD.

The command response time determining device 54 is adapted to determine that there is an HDD response delay if the response to the command is not completed even after an allowable HDD delay time set by the allowable HDD delay time setting device 92 (first setting device) in the maintenance terminal 90. Determination result information when there is a response delay is stored in the determination result information storage device 78.

The allowable HDD delay time setting control device 56 is adapted to refer to the allowable HDD delay time information storage device 76 for allowable HDD delay times and to perform control of storing an allowable HDD delay time set by the allowable HDD delay time setting device 92 in the maintenance terminal 90 into the allowable HOD delay time information storage device 76. In addition, the allowable HDD delay time is set to be shorter than the command timeout value of the HDD.

The command response order compensation device 62 (queue control device) is adapted to perform, for example, Ordered Queue control defined in the SCSI standard, in which a certain execution order of commands is provided by accumulating commands in a queue buffer and assigning Ordered Queue identifiers to tags of the commands.

Here, in addition, Ordered Queue is a queue control technique that defines sequentially processing commands in their received order in a device receiving the commands. HDDs receiving commands of Ordered Queue cannot rearrange the commands between before and after the Ordered Queue reception. This is for the purpose of compensating the response order of the commands by ordered Queue. That is, HDDs receiving Ordered Queue respond to the Ordered Queue commands after processing all commands before the Ordered Queue reception, and then process commands received newly after the Ordered Queue reception.

The new command issue control device 58 is adapted to refer to the determination result information storage device 78 for determination result information, and if the command response time determining device 54 determines that there is a response delay and it is detected that the allowable HDD delay time has passed, to control the command response order compensation device 62 to issue an initial command of Ordered Queue Task Attribute defined in the SCSI standard to the HDD after the allowable HDD delay time.

The new command issue control device 58 utilizes the characteristics of Ordered Queue control to detect commands queued and unprocessed in HDDs, and then issues new commands of Ordered Queue after the detection. Then, the rearrangement of the command control order between commands issued after the issue of Ordered Queue commands and commands delayed in processing is prevented, and the HDDs are controlled to process the commands delayed in processing before the Ordered Queue commands.

This allows the RAID controller 50 to control the response to commands remaining in the HDDs and delayed in response when the RAID controller 50 detects such commands.

The other processing sections 64 may include module control device for controlling the execution order of each device and the control by each device.

The command information storage device 72 stores information indicating the type of commands.

The command time information storage device 74 stores, for example, time information about command issue to HDDs processed by the command issue time storing device 52. In addition, if the RAID configuration 80 includes multiple HDDs, time information about command issue is stored for each HDD.

The allowable HDD delay time information storage device 76 stores, for example, allowable HDD delay time information set by the allowable HDD delay time setting device 92 in the maintenance terminal 90 and setting controlled by the allowable HDD delay time setting control device 56. In addition, if the RAID configuration 80 includes only one HDD, allowable HDD delay time information for the HDD is stored. Also, if the RAID configuration includes N HDDs (N is a natural number of 1 or more), setting information about first to Nth allowable HDD delay times is stored (accumulated) correspondingly to the N HDDs. The information is updated if there is a change in setting.

The determination result information storage device 78 stores, for example, determination result information when the command response time determining device 54 determines that there is an HDD response delay. In addition, if the RAID configuration 80 includes multiple HDDs, determination result information is stored for each HDD.

In addition, the command response time monitoring device 51 provided with the above-described arrangements according to the exemplary embodiment can configure a "request response delay monitoring device" included in the storage medium control unit according to the present invention. Also, the new command issue control device 58 and the command response order compensation device 62 can configure a "request control device" included in the storage medium control unit according to the present invention. The "request response delay monitoring device" is adapted to monitor the presence of delay in response to requests based on whether or not the response time for each request exceeds a certain allowable delay time. The "request control device" is adapted to prevent the rearrangement processing of sequential access requests that are given priority over random access requests when the response time exceeds the certain allowable delay time, and control the processing of the requests so as to be performed in a certain request order at the point when the response time exceeds the certain allowable delay time based on a result of monitoring the presence of delay in response obtained in the request response delay monitoring device. In this case, the "request control device" may assign a certain processing order identifier that indicates processing multiple requests in a certain order for each request after passing the allowable delay time and then control the processing of the requests to be performed. Specifically, it is preferable to perform Ordered Queue control of issuing an initial request after passing the allowable delay time.

The command response time monitoring device 51 can further configure a "command response delay monitoring device" included in the data storage system according to the present invention. Also, the new command issue control device 58 and the command response order compensation device 62 can configure a "command issue control device" included in the data storage system according to the present invention. The "command response delay monitoring device" is adapted to monitor the presence of delay in response to command information for a data storage medium based on whether or not the response time to the command information exceeds an allowable delay time for the data storage medium. The "command issue control device" is adapted to newly issue an initial command defining a certain order after passing the allowable delay time, based on a result of monitoring the presence of delay in response obtained in the command response delay monitoring device, to control the data storage medium.

In addition, the allowable HDD delay time setting device 92 can configure a "first setting device" included in the data storage system according to the present invention. In addition, the disk array device, an example of a data storage device including a storage medium control unit, may include first setting device. In this case, the allowable HDD delay time setting device 92 can configure a "first setting device" included in the storage medium control unit according to the present invention. The first setting device is adapted to set an allowable delay time for each request for the data storage medium. Accordingly, the "request control device" is adapted to perform control based on a first allowable delay time set by the first setting device. It is also preferable that the first allowable delay time is shorter than a command timeout value.

(General Operations of the System)

Next will be described the general operations of the thus arranged data storage system in detail with reference to FIGS. 1, 2, and 3.

An allowable HDD delay time is set in advance by an operator through the allowable HDD delay time setting device 92 in the maintenance terminal 90. In addition, the allowable HDD delay time is set to be shorter than the command timeout value of the HDD.

The command response time monitoring device 51 in the RAID controller 50 monitors response time to commands for HDDs in the RAID configuration 80. The command issue time storing device 52 in the RAID controller 50 stores the issue time of a command for an HDD into the command time information storage device 74.

The command response time determining device 54 in the RAID controller 50 determines that there is an HDD response delay if the response to the command is not completed even after exceeding an allowable HDD delay time set by the allowable HDD delay time setting device 92 in the maintenance terminal 90 and stored in the allowable HDD delay time information storage device 76, and then performs control of storing determination result information indicating that there is a response delay into the determination result information storage device 78.

Then, the new command issue control device 58 refers to the determination result information storage device 78 for the determination result information, and if it is detected that there is a response delay, controls the command response order compensation device 62 to issue a command of Ordered Queue Task Attribute defined in the SCSI standard to each corresponding HDD determined to suffer from a response delay. This allows the rearrangement of issued commands between before and after the detection and therefore the response delay to random read commands remaining in the HDDs to be prevented.

(Processing Procedures)

Figure 4:
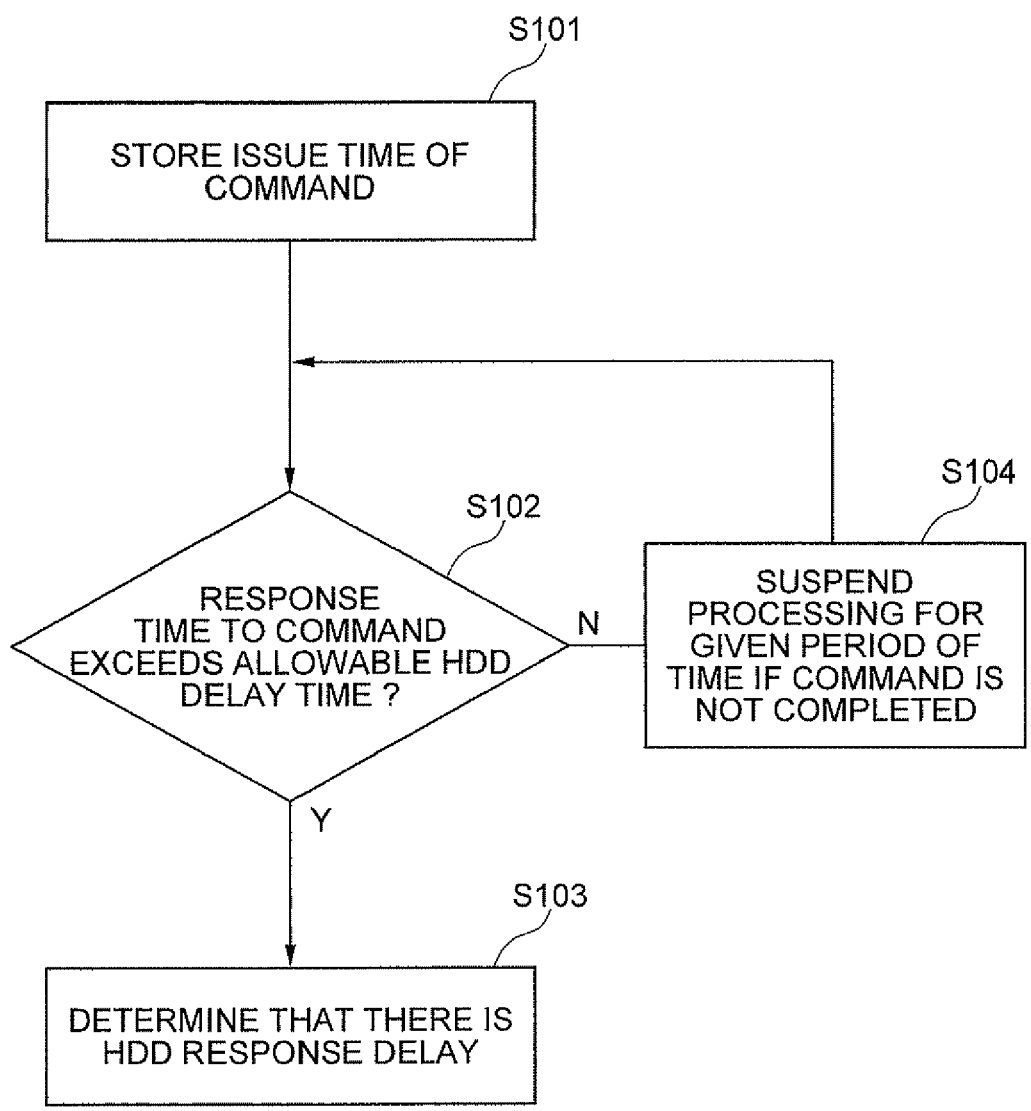
FIG. 4 is a flow chart showing an exemplary processing procedure performed in a RAID controller in a data storage device that is included in the data storage system according to the first exemplary embodiment of the invention.

In order to support the method claims, next will be described various processing procedures in the thus arranged data storage system with reference to FIG. 4. FIG. 4 is a flow chart showing an exemplary processing procedure performed in the RAID controller in the data storage device that is included in the data storage system according to the exemplary embodiment.

First, an allowable HDD delay time is set in advance by an operator through the allowable HDD delay time setting device 92 in the maintenance terminal 90 shown in FIG. 1. In addition, the allowable HDD delay time is set to be shorter than the command timeout value of the HDD.

The RAID controller 50 stores the issue time of a command (Step S101; command issue time storing step).

The RAID controller 50 determines whether or not the response time to the command exceeds an allowable HDD delay time (Step S102; command response time determining step).

If it is determined that the response time to the command does not exceed the allowable HDD delay time in the command response time determining step S102, the RAID controller 50 suspends its processing for a given period of time if the command is not completed (Step S104; given time suspending step). This causes the routine to return to Step S102.

If it is determined that the response time to the command exceeded the allowable HDD delay time in the command response time determining step S102, the RAID controller 50 determines that there is an HDD response delay and that the response delay is detected (Step S103; response delay detecting step).

In addition, the foregoing steps S101 to S103 can configure a "command response delay monitoring step" according to the present invention. The "command response delay monitoring step" is adapted to monitor the presence of delay in response to command information for the HDD based on whether or not the response time to the command information exceeded an allowable delay time for the HDD.

The RAID controller 50 stores information indicating whether or not the allowable HDD delay time has passed, and if it is detected that the allowable HDD delay time has passed, issues an initial command of Ordered Queue Task Attribute defined in the SCSI standard to the HDD after passing the allowable HDD delay time (command issuing step). In addition, this step can configure a "command issue control step" according to the present invention. The "command issue control step" is adapted to newly issue an initial command defining a certain order after passing the allowable delay time for the HDD, based on a result of monitoring the presence of delay in response obtained in the command response delay monitoring step, to control the HDD.

This allows the rearrangement of issued commands between before and after the detection and therefore the response delay to commands remaining in the HDDs to be prevented. In addition, by keeping the response time to HDD commands from each HDD within the allowable delay time for the HDD, there is such an advantage that it is possible to return a command response to the host computer connected with the disk array device including the RAID configuration within this allowable time.

Further, the RAID controller 50 checks if there is a command (request) for the other HDDs 82b, 82c, 82d, 82e, and 82f in the RAID configuration 80 and then repeats the foregoing processing by turns for the HDDs 82a, 82b, 82c, 82d, 82e, and 82f, which allows the response delay of all the HDDs 82a, 82b, 82c, 82d, 82e, and 82f in the RAID configuration 80 to be prevented.

As described heretofore, in accordance with the exemplary embodiment, the request control device can perform control with no occurrence of request rearrangement and thereby prevent the rearrangement of requests for a storage medium. This can prevent random access requests from remaining unprocessed due to the rearrangement of the requests.

In the case above, since the request response delay monitoring device monitors the presence of delay in response to requests, the request control device rearranges the requests as normal if the response delay does not exceed a certain condition, while performing control of preventing the rearrangement if the response delay exceeds a certain condition, which allows the rearrangement to be kept within an allowable range and thereby the response of the storage medium to be controlled with no deterioration in normal performance.

That is, there is exhibited an effect of prevent commands from remaining unprocessed due to the rearrangement of the commands when an HDD response delay is detected as a result of monitoring the response time of the HOD.

There is exhibited an additional effect that the maximum response time can be set for the host connected with the RAID apparatus by setting an allowable HDD delay time. Further, the command rearrangement in HDDs can be kept within an allowable range by using device for controlling commands themselves for the HDDs so that no command rearrangement occurs in the HDDs. Since the HDDs can rearrange commands in a state where no command delay can be occurred, the response of the HDDs can be controlled with no deterioration in normal performance.

As an exemplary advantage according to the invention, the request control device can perform control with no occurrence of request rearrangement and thereby prevent the rearrangement of requests for a storage medium. This can prevent random access requests from remaining unprocessed due to the rearrangement of the requests. In this case, since the request response delay monitoring device monitors the presence of delay in response to requests, the request control device rearranges the requests as normal if the response delay does not exceed a certain condition, while performing control of preventing the rearrangement if the response delay exceeds a certain condition, which allows the rearrangement to be kept within an allowable range and thereby the response of the storage medium to be controlled with no deterioration in normal performance.

Second Exemplary Embodiment

Figure 5:
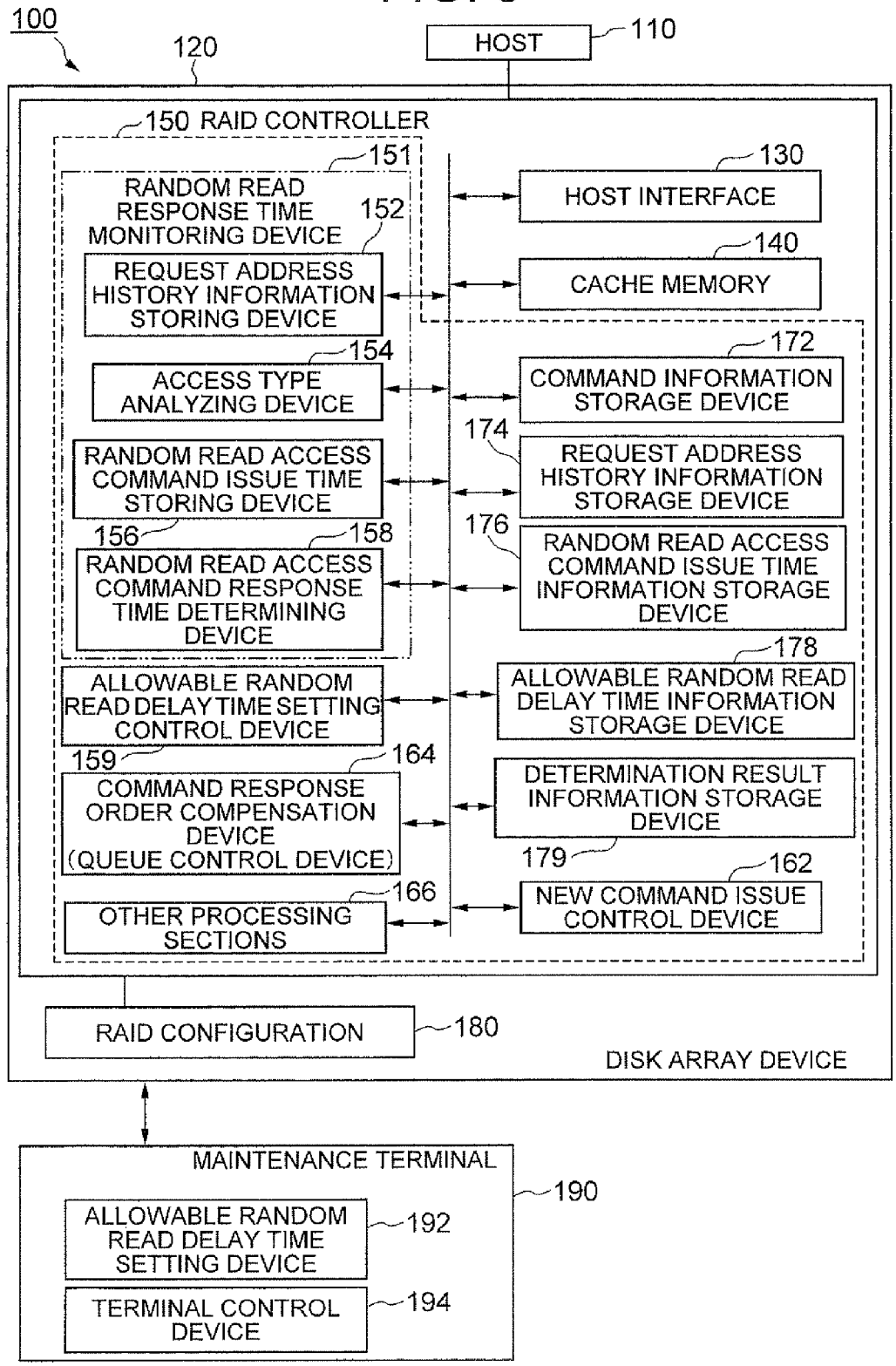
FIG. 5 is a block diagram showing an example of the configuration of a disk array device in a data storage system according to a second exemplary embodiment of the invention.

Next will be described a second exemplary embodiment of the present invention with reference to FIGS. 5 and 6. In addition, the descriptions of components that are substantially the same as those in the first exemplary embodiment are omitted below to describe only components different therefrom. FIG. 5 is a block diagram showing an example of the configuration of a data storage system according to the second exemplary embodiment of the present invention.

Although the data storage device according to the first exemplary embodiment is adapted to monitor response time to commands for HDDs, the exemplary embodiment is arranged in such a manner as to monitor random read response time for HDDs. That is, the exemplary embodiment describes the case of employing random read response time monitoring device 151 for monitoring random read response time for HDDs as an example of the "request response delay monitoring device."

Specifically, the data storage system 100 according to the exemplary embodiment includes a host computer 110, a disk array device 120, and a maintenance terminal 190 as shown in FIG. 5, as is the case in the first exemplary embodiment.

The disk array device 120 includes a host interface 130, a cache memory 140, a RAID controller 150, and a RAID configuration 180.

The RAID controller 150 includes random read response time monitoring device 151, allowable random read delay time setting control device 159, new command issue control device 162, command response order compensation device 164 (queue control device), other processing sections 166, command information storage device 172, request address history information storage device 174, random read access command issue time information storage device 176, allowable random read delay time information storage device 178, and determination result information storage device 179.

The random read response time monitoring device 151 includes request address history information storing device 152, access type analyzing device 154, random read access command issue time storing device 156, and random read access command response time determining device 158. In addition, the other processing sections 166 may include module control device for controlling the execution order of each device and the control by each device.

The maintenance terminal 190 includes: allowable random read delay time setting device 192 (second setting device) for setting an allowable random read delay time for at least one HDD in the RAID configuration 180; and terminal control device 194 having functions of controlling other components such as a control function of sending setting information set by the allowable random read delay time setting device 192 to the disk array device 120 via communication device not shown in the drawings.

In addition, if the RAID configuration 180 includes only one HDD for example, the allowable random read delay time setting device 192 can set an allowable random read delay time for the HDD. Also, if the RAID configuration includes N HDDs (N is a natural number of 1 or more), first to Nth allowable random read delay time setting sections may be provided so that first to Nth allowable random read delay times can be set for the respective N HDDs.

The random read response time monitoring device 151 is adapted to monitor random read response time. The request address history information storing device 152 is adapted to perform control of storing history information of request addresses of read commands issued to HDDs into the request address history information storage device 174.

The access type analyzing device 154 is adapted to refer to the information of the request addresses in the request address history information storage device 174 for addresses of previously issued commands from the address history and to analyze the access as a sequential access if the command to be issued currently follows the last issued command, while analyzing the access as a random access and detecting a random read access to the HDD if the command to be issued currently does not follow the last issued command.

The random read access command issue time storing device 156 is adapted to store the issue time of a random read access command, if detected by the access type analyzing device 154, into the random read access command issue time information storage device 176.

The random read access command response time determining device 158 is adapted to refer to the allowable random read delay time information storage device 178 for allowable HDD delay times and to perform control of determining that there is a random read response delay from the HDD if the response to the command is not completed even after exceeding an allowable random read delay time for the HOD set by the allowable random read delay time setting device 192 in the maintenance terminal 190. Determination result information when there is a response delay is stored in the determination result information storage device 179.

The allowable random read delay time setting control device 159 is adapted to perform control of storing an allowable random read delay time set by the allowable random read delay time setting device 192 in the maintenance terminal 190 into the allowable random read delay time information storage device 178. In addition, the allowable random read delay time is set to be shorter than the command timeout value of the HDD.

The command response order compensation device 164 (queue control device) is adapted to perform, for example, Ordered Queue control defined in the SCSI standard, in which a certain execution order of commands is provided by accumulating commands in a queue buffer and assigning Ordered Queue identifiers to tags of the commands.

The new command issue control device 162 is adapted to refer to the determination result information storage device 179, and if the random read access command response time determining device 158 determines that there is a response delay and it is detected that the allowable HDD delay time has passed as a result of referring to the allowable random read delay time information storage device 178 for allowable HDD delay times, to control the command response order compensation device 164 to issue an initial command of Ordered Queue Task Attribute defined in the SCSI standard to the HDD after passing the allowable random read delay time.

In addition, the random read response time monitoring device 151 provided with the above-described arrangements according to the exemplary embodiment can configure a "request response delay monitoring device" included in the storage medium control unit according to the present invention. Also, the new command issue control device 162 and the command response order compensation device 164 can configure a "request control device" included in the storage medium control unit according to the present invention. The "request response delay monitoring device" is adapted to monitor the presence of delay in response to requests based on whether or not the response time for each request exceeds a certain allowable delay time. The "request control device" is adapted to prevent the rearrangement processing of sequential access requests that are given priority over random access requests when the response time exceeds the certain allowable delay time, and control the processing of the requests so as to be performed in a certain request order at the point when the response time exceeds the certain allowable delay time based on a result of monitoring the presence of delay in response obtained in the request response delay monitoring device. In this case, the "request control device" may assign a certain processing order identifier that indicates processing multiple requests in a certain order for each request after passing the allowable delay time and then control the processing of the requests to be performed. Specifically, it is preferable to perform Ordered Queue control of issuing an initial request after passing the allowable delay time.

The random read response time monitoring device 151 can further configure a "random read response delay monitoring device" included in the data storage system according to the present invention. Also, the new command issue control device 162 and the command response order compensation device 164 can configure a "command issue control device" included in the data storage system according to the present invention. The "random read response delay monitoring device" is adapted to monitor the presence of delay in response to random read for a data storage medium based on whether or not the response time to the random read command exceeds an allowable delay time for the random read. The "command issue control device" is adapted to newly issue an initial command defining a certain order after passing the allowable delay time based on a result of monitoring the presence of delay in response obtained in the random read response delay monitoring device to control the data storage medium.

In addition, the allowable random read delay time setting device 192 can configure a "second setting device" included in the data storage system according to the present invention. In addition, the disk array device, an example of a data storage device including a storage medium control unit, may include second setting device. In this case, the allowable random read delay time setting device 192 can configure a "second setting device" included in the storage medium control unit according to the present invention. The "second setting device" is adapted to set an allowable delay time for each random access request. Accordingly, the "request control device" is adapted to perform control based on a second allowable delay time set by the second setting device. It is also preferable that the second allowable delay time is shorter than a command timeout value.

The thus arranged disk array device 120 in the data storage system operates generally as follows. That is, an allowable random read delay time is set in advance by an operator through the allowable random read delay time setting device 192 in the maintenance terminal 190 shown in FIG. 5. The allowable random read delay time is set to be shorter than the command timeout value of the HDD. The allowable random read delay time is stored in, for example, the allowable random read delay time information storage device 178 in the RAID controller 150.

The RAID controller 150 also monitors random read response time. The RAID controller 150 stores history information of request addresses of read commands issued to the HDD and refers to the address history information for addresses of previously issued commands, and then analyzes the access as a sequential access if the command to be issued currently follows the last issued command, while analyzing the access as a random access and detecting a random read access to the HDD if the command to be issued currently does not follow the last issued command.

Then, the RAID controller 150 stores the issue time of a random read access command if detected, and determines that there is a random read response delay from the HDD if the response to the command is not completed even after exceeding an allowable random read delay time for the HDD set by the allowable random read delay time setting device 192 in the maintenance terminal 190.

In order to support the method claims, next will be described various processing procedures in the thus arranged data storage system with reference to FIG. 6. FIG. 6 is a flow chart showing an exemplary processing procedure performed in the RAID controller in the data storage device that is included in the data storage system according to the exemplary embodiment.

First, the RAID controller 150 monitors random read response time. Then, the RAID controller 150 stores request addresses of read commands issued to HDDs into, for example, the request address history information storage device 174 (Step S201; request address history information storing step).

Next, the RAID controller 150 determines whether or not to be sequential to the request address of the last read command (Step S202; access type analyzing step).

If it is determined to be sequential to the request address of the last read command in the access type analyzing step S202, that is, the command is determined to be a sequential read command, the RAID controller 150 completes its processing.

On the contrary, if it is determined not to be sequential to the request address of the last read command in the access type analyzing step S202, that is, the command is determined to be a random read command, the RAID controller 150 detects a random read access to the HOD (Step S203; random read access detecting step).

That is, through the foregoing steps S201 to S203, the address history information is referred to for addresses of previously issued commands, and then analyzes the access as a sequential access if the command to be issued currently follows the last issued command, while analyzing the access as a random access and detecting a random read access to the HDD if the command to be issued currently does not follow the last issued command.

Further, the RAID controller 150 stores the issue time of a command (Step S204; random read access command issue time storing step).

The RAID controller 150 then determines whether or not the response time to the command exceeds an allowable time for random read access (Step S205; random read response time determining step).

If it is determined that the response time to the command does not exceed the allowable random read delay time in the random read response time determining step S205, the RAID controller 150 suspends its processing for a given period of time if the command is not completed (Step S206; given time suspending step). This causes the routine to return to Step S205.

If it is determined that the response time to the random read command exceeds the allowable random read delay time in the random read command response time determining step S205, the RAID controller 150 determines that there is a random read response delay and that the response delay is detected (Step S207; random read response delay detecting step).

That is, through the foregoing steps S205 to S207, the RAID controller 150 stores the issue time of a random read access command if detected, and determines that there is a random read response delay from the HDD if the response to the command is not completed even after exceeding an allowable random read delay time for the HDD set by the allowable random read delay time setting device 192 in the maintenance terminal 190.

In addition, the foregoing steps S201 to S207 can configure a "random read response delay monitoring step" according to the present invention. The "random read response delay monitoring step" is adapted to monitor the presence of delay in response to random read for a storage medium (HDD) based on whether or not the response time to the random read command exceeds an allowable delay time for the random read. Here, it is preferable that the allowable delay time is shorter than a command timeout value.

Also, the "random read response delay monitoring step" is adapted to store history information of request addresses of read commands issued to the storage medium (HDD) and refer to the history information for addresses of previously issued commands, and then to analyze the access as a sequential access if the command to be issued currently follows the last issued command, while analyzing the access as a random access if the command to be issued currently does not follow the last issued command, and further to store the issue time of a random read access command if detected and then determine that there is a random read response delay from the storage medium (HOD) if the response to the random read access command is not completed even after exceeding a preset allowable random read delay time for the storage medium (HDD).

The RAID controller 150 then stores whether or not the allowable random read delay time has passed, and if it is detected that the allowable random read delay time has passed, issues an initial command of Ordered Queue Task Attribute defined in the SCSI standard to the HDD after passing the allowable random read delay time (command issuing step).

In addition, this step can configure a "command issue control step" according to the present invention. The "command issue control step" is adapted to newly issue an initial command defining a certain order after passing the allowable random read delay time based on a result of monitoring the presence of delay in response obtained in the "random read response delay monitoring step" to control the storage medium (HOD).

As described heretofore, in accordance with the exemplary embodiment, the rearrangement processing between sequential read commands and random read commands due to the priority of sequential read commands over random read commands can be prevented, which allows random read commands not to remain in the HDDs and thereby the response delay to random read commands to be prevented.

Third Exemplary Embodiment

Figure 7:
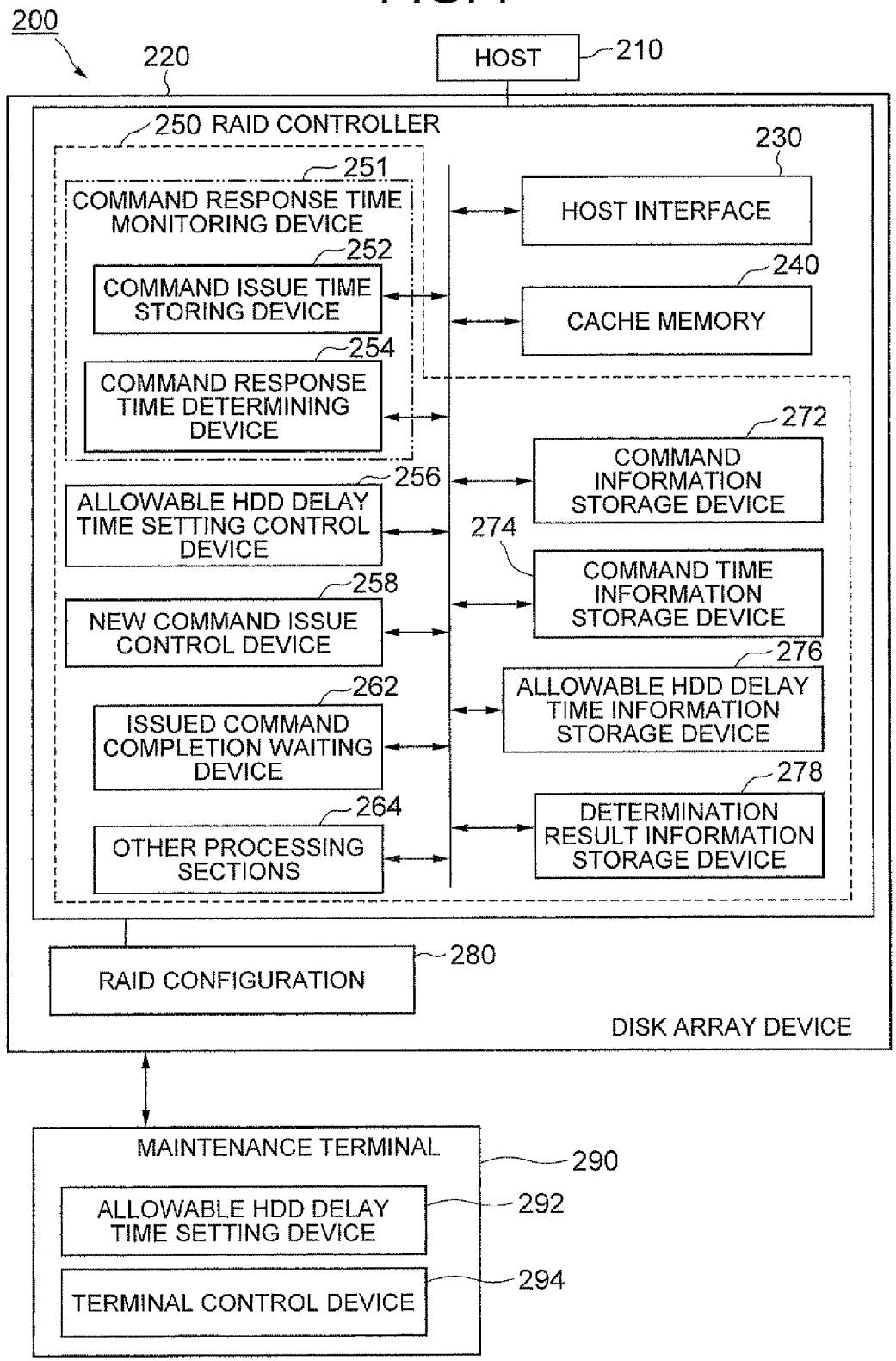
FIG. 7 is a block diagram showing an example of the configuration of a disk array device in a data storage system according to a third exemplary embodiment of the invention.

Next will be described a third exemplary embodiment of the present invention with reference to FIG. 7. In addition, the descriptions of components that are substantially the same as those in the first exemplary embodiment are omitted below to describe only components different therefrom. FIG. 7 is a block diagram showing an example of the configuration of a disk array device in a data storage system according to the third exemplary embodiment of the present invention.

Although the request control device according to the first exemplary embodiment utilizes Ordered Queue control, the request control device according to the exemplary embodiment is adapted, if it is detected that the allowable HDD delay time is exceeded, to limit the issue of requests (commands) to the HDD after the detection until the processing of all requests (commands) issued before the detection is completed. That is, when a response delay is detected, additional command issue to the HDD is to be suspended until all commands issued are completed, instead of Ordered Queue issue.

Specifically, the data storage system 200 according to the exemplary embodiment includes a host computer 210, a disk array device 220, and a maintenance terminal 290 as shown in FIG. 7, as is the case in the first exemplary embodiment.

The maintenance terminal 290 includes allowable HDD delay time setting device 292 and terminal control device 294.

The disk array device 220 includes a host interface 230, a cache memory 240, a RAID controller 250, and a RAID configuration 280.

The RAID controller 250 includes command response time monitoring device 251 including command issue time storing device 252 and command response time determining device 254, allowable HDD delay time setting control device 256, new command issue control device 258, other processing sections 264, command information storage device 272, command time information storage device 274, allowable HDD delay time information storage device 276, and determination result information storage device 278, as is the case in the first exemplary embodiment, and further includes issued command completion waiting device 262.

The issued command completion waiting device 262 is adapted, if the command response time monitoring device 251 detects a response delay to HDD commands, to perform control of limiting the issue of commands by suspending additional command issue to the HDD until all commands issued are completed, instead of Ordered Queue issue as described in the first exemplary embodiment.

Also, the "command issue control step" is adapted to perform control of suspending additional command issue to the storage medium (HDD) until all commands issued are completed.

As described heretofore, the exemplary embodiment is useful for control not employing Ordered Queue defined in the SCSI standard, such as SATA-HOD control, while exhibiting the same effects as in the first exemplary embodiment.

Fourth Exemplary Embodiment

Figure 8:
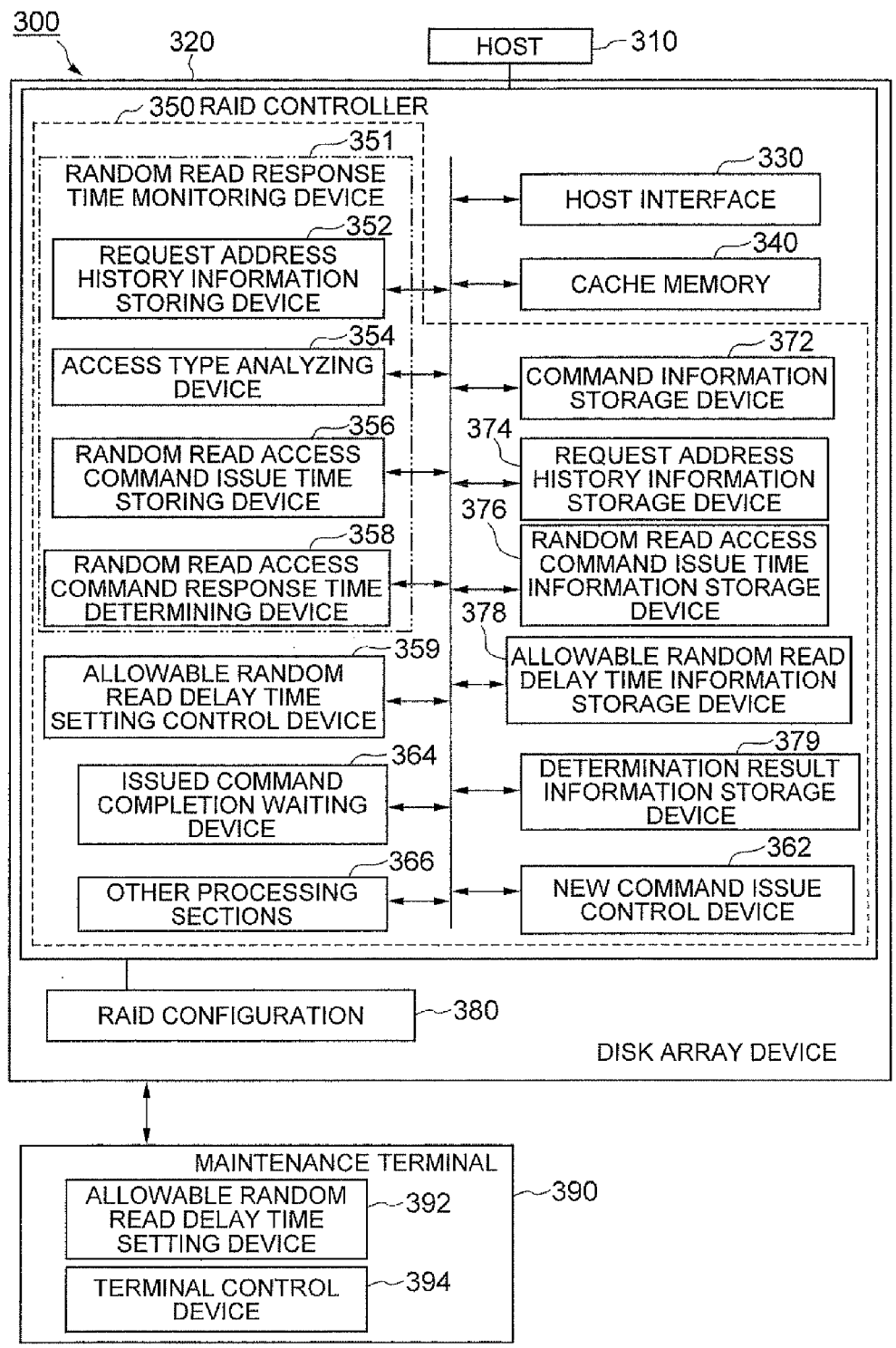
FIG. 8 is a block diagram showing an example of the configuration of a disk array device in a data storage system according to a fourth exemplary embodiment of the invention.

Next will be described a fourth exemplary embodiment of the present invention with reference to FIG. 8. In addition, the descriptions of components that are substantially the same as those in the third exemplary embodiment are omitted below to describe only components different therefrom. FIG. 8 is a block diagram showing an example of the configuration of a disk array device in a data storage system according to the fourth exemplary embodiment of the present invention.

Although the request control device according to the third exemplary embodiment is adapted, if it is detected that the allowable HDD delay time is exceeded, to limit the issue of requests (commands) to the HDD after the detection until the processing of all requests (commands) issued before the detection is completed, the exemplary embodiment shows an example of the case where the allowable delay time is an allowable random read delay time as in the second exemplary embodiment.

Specifically, the data storage system 300 according to the exemplary embodiment includes a host computer 310, a disk array device 320, and a maintenance terminal 390 as shown in FIG. 8, as is the case in the second exemplary embodiment.

The maintenance terminal 390 includes allowable random read delay time setting device 392 and terminal control device 394.

The disk array device 320 includes a host interface 330, a cache memory 340, a RAID controller 350, and a RAID configuration 380.

The RAID controller 350 includes: random read response time monitoring device 351 including request address history information storing device 352, access type analyzing device 354, random read access command issue time storing device 356, and random read access command response time determining device 358; allowable random read delay time setting control device 359; other processing sections 366; command information storage device 372; request address history information storage device 374; random read access command issue time information storage device 376; allowable random read delay time information storage device 378; determination result information storage device 379; new command issue control device 362, as is the case in the second exemplary embodiment, and further includes issued command completion waiting device 364.

The issued command completion waiting device 364 is adapted, if the random read response time monitoring device 351 detects a response delay to HDD commands, to perform control of limiting the issue of commands by suspending additional command issue to the HDD until all commands issued are completed, instead of Ordered Queue issue as described in the second exemplary embodiment.

Also, the "command issue control step" is adapted to perform control of suspending additional command issue to the storage medium (HDD) until all commands issued are completed.

As described heretofore, the exemplary embodiment is useful for control not employing Ordered Queue defined in the SCSI standard, such as SATA-HDD control, while exhibiting the same effects as in the second exemplary embodiment that the rearrangement processing between sequential read commands and random read commands due to the priority of sequential read commands over random read commands can be prevented, which allows random read commands not to remain in the HDDs and thereby the response delay to random read commands to be prevented.

(Exemplary Variations)

In addition, the data storage system and the control method for storage device according to the present invention have been described based on several particular embodiments, and various modifications may be made to the above-described exemplary embodiments of the invention without departing from the spirit and scope of the invention.

For example, although the above-described exemplary embodiments have arrangements that an allowable HOD delay time or an allowable random read delay time is set by an operator through the allowable HDD delay time setting device (first setting device) or the allowable random read delay time setting device 392 (second setting device) in the maintenance terminal, the time may be set automatically by the data storage device included in the data storage system. In this case, it is preferable that a first allowable delay time set by the first setting device or a second allowable delay time set by the second setting device is shorter than a command timeout value.

Also, the HDDs in the RAID configuration may be of a first configuration including no RAID configuration. The first configuration includes at least one HDD. The first configuration may further be, for example, an HDD connected to a PC. The present invention is applicable also to such arrangements. This is for the reason that command delay is monitored for each HDD.

Although examples for the case of mixed sequential and random read commands have been described, the case of mixed sequential and random write commands may also be included as long as they are sequential and random access requests. In this case, random write access command response time monitoring device may be provided. Sequential read command response time monitoring device and sequential write command response time monitoring device may further be provided. For monitoring of response time, allowable random write delay time setting device, allowable sequential read delay time setting device, and allowable sequential write delay time setting device may be provided and set.

Furthermore, the allowable delay time for random read commands and/or HDD commands may be set commonly to multiple HDDs or may be set separately for each HDD. In this case, first-first allowable delay time setting device for a first storage medium, first-second allowable random read delay time setting device for the first storage medium, second-first allowable delay time setting device for a second storage medium, second-second allowable random read delay time setting device for the first storage medium, . . . , Nth-first allowable delay time setting device for an Nth storage medium, and Nth-second allowable random read delay time setting device for the Nth storage medium may be provided.

In addition, the request control device may perform control in consideration of the sequential and/or statistical distribution in each request (command) queue.

Further, the first or second setting device may set multiple allowable delay times (e.g. first or second temporary allowable delay time before the true allowable delay time) for each command (request).

Moreover, both the command response time monitoring device according to the first exemplary embodiment and the random read response time monitoring device according to the second exemplary embodiment may be provided. In this case, the "request response delay monitoring device" includes command response time monitoring device and random read response time monitoring device.

Also, multiple host computers may be provided, though one host computer 10 is exemplified in the above-described exemplary embodiment. The above-described embodiments exemplify the case of providing a maintenance terminal and a host computer separately, but without being limited thereto, functions as a host computer and a maintenance terminal may be provided in one information processing apparatus.

The "system" in the above-described exemplary embodiments also means a logical collection of multiple devices, regardless of whether or not the devices exist in the same chassis. Consequently, the present invention may be applied to systems including multiple pieces of equipment or may be applied to devices including one piece of equipment.

In addition, the network in the data storage system which makes the maintenance terminal and the disk array device, as well as the host computer and the disk array device, communicate with each other via networks may have any hardware configuration such as mobile telephone networks (including base stations and switching systems), public telephone networks, IP telephone networks, ISDN networks and various similar networks, Internet (i.e. communication mode supported by the TCP/IP protocol), intranets, LANs (including Ethernet (registered trademark) and Gigabit Ethernet), WANs, optical fiber communication networks, power line communication networks, and various broadband private networks. In addition to the TCP/IP protocol, the network may further be supported by any communication protocol such as networks supported by various communication protocols, virtual networks established by software, and various similar networks. Also, without being limited to wired networks, the network may be a wireless network (including satellite communication and various high-frequency communication device, such as single carrier communication systems like simplified telephone systems and mobile phone systems, spread spectrum communication systems like W-CDMAs and IEEE802.11b based wireless LANs, and multicarrier communication systems like IEEE802.11a and HiperLAN/2), or may be a combination of these networks or a system connected with other networks. Further, the network may have any topology such as point-to-point, point-to-multipoint, and multipoint-to-multipoint.

As for the communication structure between the host computer and the disk array device or between the disk array device and the maintenance terminal, the type of the interface formed on one or either end thereof may be, for example, parallel, USB, IEEE1394, networks such as LANs, WANs, and other similar networks, or any interface to be developed in the future.

In addition, the "communication" includes not only wireless communications and wired communications but also mixed wireless and wired communications, that is, applying wireless communication to certain blocks and wired communication to the other blocks, and may further include applying wired communication to the communication from one to the other device and wireless communication to the communication from the other to the one device.

(Programs)

Figure 6:
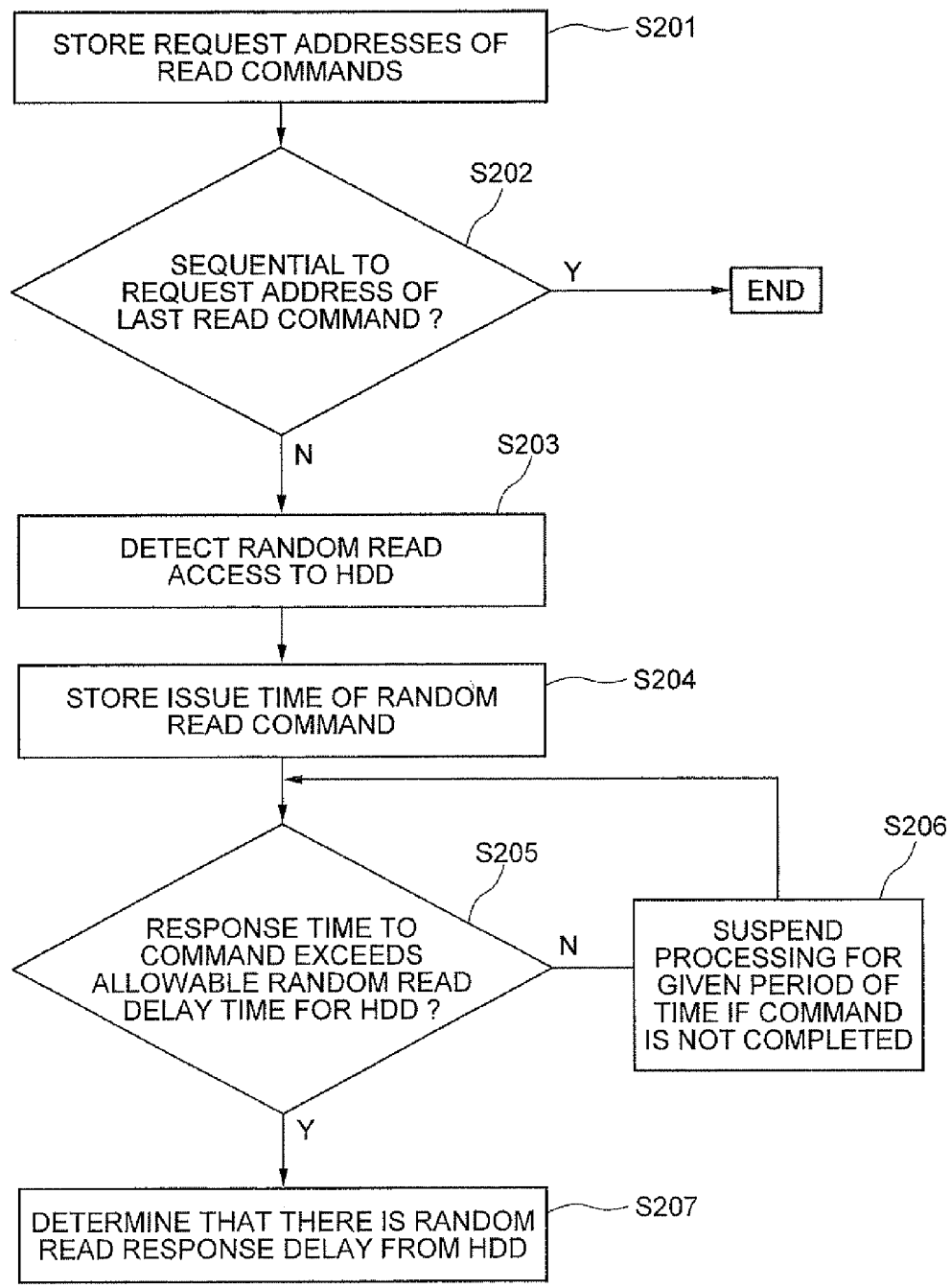
FIG. 6 is a flow chart showing an exemplary processing procedure performed in a RAID controller in a data storage device that is included in the data storage system according to the second exemplary embodiment of the invention.

The software programs (for controlling the storage medium control unit used in the data storage device) according to the present invention for achieving functions in the above-described exemplary embodiments also include: programs corresponding to the devices, processing devices, and functions shown in the block diagrams of FIGS. 3, 5, 7, and 8 for the above-described respective exemplary embodiments; programs corresponding to the processing procedures, processing devices, and functions shown in the flow charts of FIGS. 4 and 6; programs to be processed in the data storage system according to the above-described exemplary embodiments, the disk array device (data storage device), host computer, and maintenance terminal for use in the system, and the RAID controller (RAID control unit, i.e., storage medium control unit) for use in the disk array device; and the whole or part of the methods (steps) described generally in this specification, processing described herein, and data (e.g. various data and data structure information such as allowable HDD delay time information, command time information, command information, determination result information, request address history information, random read access command issue time information, and allowable random read delay time information).

The programs may have any form such as object codes, programs to be executed by an interpreter, and script data to be supplied to the OS. The programs may also be implemented by any high-level procedural or object-oriented programming language, or if needed, by any assembly or machine language. In each case, the language may be of compiler type or interpreter type. Content sharing programs may be included which are incorporated in application software operable on common personal computers and portable information terminals.

The source of control programs for the RAID control unit may be external equipment made to communicate with the computer via a telecommunication link (regardless of whether wired or wireless). The programs may also be supplied by, for example, accessing a website on the Internet through the computer browser and downloading programs or compressed files with an auto-install function from the website to a recording medium such as a hard disk. The program supply may be achieved by dividing program codes that configure the programs into multiple files and downloading the files from different websites. That is, servers from which multiple users download program files for achieving the functional processing according to the present invention in a computer are also included in the scope of the invention.

(Information Recording Media)

The control programs for the RAID control unit (storage device) may also be recorded on an information recording medium. The information recording medium stores a group of programs including the control programs, and the computer can read the group of programs from the information recording medium and then store the programs on a memory. This allows the group of programs to be provided by being recorded on an information recording medium such as a magnetic recording medium, optical recording medium, or ROM. Using such an information recording medium with programs recorded thereon in a computer provides advantageous information processing equipment.

The information recording medium for supplying programs may employ, for example, a semiconductor memory and integrated circuit such as a ROM, RAM, flash memory, or SRAM, USB memory or memory card including such memories, optical disk, magneto-optical disk, or magnetic recording medium, and may further employ a portable medium such as a flexible disk, CD-ROM, CD-R, CD-RW, FD, DVD-RAM, DVD-ROM, DVD-R, DVD-RW, DVD+R, DVD+RW, MO, ZIP, magnetic card, magnetic tape, SD card, memory stick, nonvolatile memory card, or IC card, or may be recorded on a storage device, such as a hard disk, incorporated in a computer system.

In addition, the "information recording medium" includes media (transmission media or transmitted waves) for holding programs dynamically for a short period of time, such as communication lines for the case of sending programs via networks such as the Internet or communication links such as telephone lines, and also media for holding programs for a certain period of time, such as volatile memories in server and client computer systems in such cases.

It is further possible to execute encrypted programs by storing the programs on a recording medium to distribute to users and allowing users that meet a predetermined condition to download and use decryption key information for decrypting from the website via the Internet. In this case, the present invention may include components of the control programs (various devices, steps, and data) and encryption device for encrypting the control programs.

Furthermore, information processing equipment as the maintenance terminal and host computer above or information processing equipment including a control unit (e.g. HDD in common PCs) provided with control programs for controlling a storage medium may include, for example, not only personal computers but also various servers, EWSs (engineering workstations), medium-sized computers, and mainframes. In addition to these examples, electronic equipment with an HDD mounted thereon may include various TVs, videos, DVO recorders, audio equipment, appliances with various information and communication functions, game consoles having network functions, and complex machines including a facsimile terminal and/or a copier, and may further include PC card type HDDs. Storage medium control units mounted on such equipment may also be included in the scope of the invention.

The programs may also achieve part of the functions above or may be combined with programs that have already been recorded in a computer system to achieve the functions above, that is, so-called differential files (differential programs).

In addition, the steps shown in the flow charts in this specification include not only time-oriented processing according to the procedure described but also, without necessarily being limited to such time-oriented processing, parallel or separate processing. Also in the implementation, the execution order of the programs (steps) may be changed. Further if needed for the implementation, the specified procedure (steps) described in this specification may be implemented, removed, added, or rearranged as combined procedures (steps).

In addition, the program functions of the disk array device, which correspond to the devices, functions, and step procedures therein, may be achieved by dedicated hardware (e.g. dedicated semiconductor circuits). Alternatively, part of all program functions may be processed by hardware, while the other by software. In the case of dedicated hardware, each part may be formed as an integrated circuit such as an LSI.

These may each be formed into one chip, or the whole or part thereof may be formed into one chip. Also, LSIs may include other functional blocks such as streaming engines. Further, without being limited to LSIs, the integrated circuits may be achieved by dedicated circuits or general-purpose processors. It will be considered that when a new integration technique that can replace LSIs appears with advancements in semiconductor technology or its derived technologies, the technique may be used for integration of functional blocks.

Moreover, the above-described exemplary embodiments include various stages, and therefore appropriately combining multiple constitutional features disclosed allows various inventions to be extracted. That is, as a matter of course, combinational examples of the above-described exemplary embodiments or any of the exemplary embodiments and any of the exemplary variations are included. In this case, as for the effects apparent from the arrangements disclosed in the exemplary embodiments and their exemplary variations, the same can rightly apply to these example seven with no particular description in the exemplary embodiments. Also, some of all the constitutional features described in the exemplary embodiments may be removed.

Another aspect of a data storage system according to another exemplary embodiment of the present invention includes: a host computer; a data storage device made to communicate with the host computer via a network to store data from the host computer into a data storage medium; and a maintenance terminal made to communicate with the data storage device via the network. The data storage device includes random read response delay monitoring device and command issue control device. The random read response delay monitoring device is adapted to monitor the presence of delay in response to random read for the data storage medium based on whether or not the response time to the random read exceeds an allowable delay time for the random read. The command issue control device is adapted to newly issue an initial command defining a certain order after passing the allowable delay time based on a result of monitoring the presence of delay in response obtained in the random read response delay monitoring device to control the data storage medium.

One aspect of a control method for a data storage device including at least one HDD according to another exemplary embodiment of the present invention includes a command response delay monitoring step and a command issue control step. The command response delay monitoring step is adapted to monitor the presence of delay in response to command information for the HDD based on whether or not the response time to the command information exceeds an allowable delay time for the HDD. The command issue control step is adapted to newly issue an initial command defining a certain order after passing the allowable delay time for the HDD based on a result of monitoring the presence of delay in response obtained in the command response delay monitoring step to control the HDD.

Another aspect of the control method for a data storage device including at least one HDD according to another exemplary embodiment of the present invention includes a random read response delay monitoring step and a command issue control step. The random read response delay monitoring step is adapted to monitor the presence of delay in response to random read for the HDD based on whether or not the response time to the random read exceeds an allowable delay time for the random read. The command issue control step is adapted to newly issue an initial command defining a certain order after passing the allowable delay time for the random read based on a result of monitoring the presence of delay in response obtained in the random read response delay monitoring step to control the HDD.

One aspect of a control program for a data storage device including at least one HDD according to another exemplary embodiment of the present invention is adapted to cause a computer to function as command response delay monitoring device and command issue control device. The command response delay monitoring device is adapted to monitor the presence of delay in response to command information for the HDD based on whether or not the response time to the command information exceeds an allowable delay time for the HDD. The command issue control device is adapted to newly issue an initial command defining a certain order after passing the allowable delay time based on a result of monitoring the presence of delay in response obtained in the command response delay monitoring device to control the HDD.

Another aspect of the control program for a data storage device including at least one HDD according to another exemplary embodiment of the present invention is adapted to cause a computer to function as random read response delay monitoring device and command issue control device. The random read response delay monitoring device is adapted to monitor the presence of delay in response to random read for the HDD based on whether or not the response time to the random read command overruns an allowable delay time for the random read. The command issue control device is adapted to newly issue an initial command defining a certain order after passing the allowable delay time based on a result of monitoring the presence of delay in response to the random read response delay monitoring device to control the HDD.

The descriptions above disclose only one example of the exemplary embodiments of the present invention to facilitate understanding of the invention, and thus the exemplary embodiments and their exemplary variations just exemplify illustrative exemplary embodiments of the present invention and, without being limited thereto, may be modified and/or changed appropriately within a predetermined range. The present invention may be embodied variously without departing from the spirit and basic features thereof, and the exemplary embodiments and their exemplary variations are not to be construed as a limitation on the technical scope of the present invention. Accordingly, the components disclosed in the above-described exemplary embodiments include all design variations and equivalents belonging to the technical scope of the present invention.

INDUSTRIAL APPLICABILITY

The present invention is applicable to the computer industry and, in more detail, to the storage device manufacturing industry.

What is claimed is:

1. A storage medium control unit for use in a data storage device adapted to perform processing on a data storage medium with data stored therein based on a plurality of requests including sequential access requests and random access requests, the control unit comprising:
   request response delay monitoring device for monitoring presence of delay in response to the requests based on whether or not the response time for each request exceeds a certain allowable delay time; and
   request control device for preventing rearrangement processing of the sequential access requests that are given priority over the random access requests when the response time exceeds the certain allowable delay time and controlling the processing of the requests to be performed in a certain request order at the point when the response time exceeds the certain allowable delay time based on a result of monitoring the presence of delay obtained in the request response delay monitoring device.

2. The storage medium control unit according to claim 1, wherein
the request control device is adapted to assign a certain processing order identifier that indicates processing the plurality of requests in a certain order for each request after passing the allowable delay time and then control the processing of the requests to be performed.

3. The storage medium control unit according to claim 1, wherein
the request control device is adapted to perform control of limiting the issue of requests after passing the allowable delay time regardless of the types of the requests until the processing of the requests before the allowable delay time is completed after passing the allowable delay time.

4. The storage medium control unit according to claim 1, further comprising first setting device for setting an allowable delay time for each request for the data storage medium, wherein
the request control device is adapted to perform control based on a first allowable delay time set by the first setting device.

5. The storage medium control unit according to claim 1, further comprising second setting device for setting an allowable delay time for each random access request, wherein
the request control device is adapted to perform control based on a second allowable delay time set by the second setting device.

6. The storage medium control unit according to claim 4, wherein
the first allowable delay time is shorter than a command timeout value.

7. The storage medium control unit according to claim 5, wherein
the second allowable delay time is shorter than a command timeout value.

8. The storage medium control unit according to claim 2, wherein
the request control device is adapted to perform Ordered Queue control of issuing an initial request after the allowable delay time.

9. The storage medium control unit according to claim 1, wherein
the request response delay monitoring device comprises random read response delay monitoring device for monitoring the presence of delay in response to random read access requests.

10. The storage medium control unit according to claim 9, wherein
the random read response delay monitoring device comprises:
request address history information storing device for storing history information of request addresses of read commands issued to the data storage medium;
access type analyzing device adapted to refer to the history information of the request addresses in the request address history information storing device for addresses of previously issued commands and to detect a sequential access if the command to be issued currently follows the last issued command, while analyzing the access as a random access and detecting a random read access to the data storage medium if the command to be issued currently does not follow the last issued command;
random read access command issue time storing device for storing the issue time of a random read access command if detected by the access type analyzing device; and
random read access command response time determining device adapted to determine that there is a random read response delay from the data storage medium if the response to the random read access command is not completed even after exceeding a preset allowable random read delay time for the data storage medium.

11. A storage medium control unit for use in a data storage device adapted to perform processing on a data storage medium with data stored therein based on a plurality of requests including sequential access requests and random access requests, the control unit comprising:
request response delay monitoring means for monitoring presence of delay in response to the requests based on whether or not the response time for each request exceeds a certain allowable delay time; and
request control means for preventing rearrangement processing of the sequential access requests that are given priority over the random access requests when the response time exceeds the certain allowable delay time and controlling the processing of the requests to be performed in a certain request order at the point when the response time exceeds the certain allowable delay time based on a result of monitoring the presence of delay obtained in the request response delay monitoring means.

12. A data storage device comprising:
a first configuration including at least one storage medium; and
a storage medium control unit according to claim 1, wherein
the first configuration includes a RAID configuration, and wherein
the storage medium control unit includes a RAID control unit.

13. A data storage system comprising:
a host computer;
a data storage device made to communicate with the host computer via a network to store data from the host computer into a data storage medium; and
a maintenance terminal made to communicate with the data storage device via the network, wherein
the data storage device comprises:
random read response delay monitoring device for monitoring the presence of delay in response to random read for the data storage medium based on whether or not the response time to the random read command exceeds an allowable delay time for the random read; and
command issue control device for newly issuing an initial command defining a certain order after passing the allowable delay time based on a result of monitoring the presence of delay in response via the random read response delay monitoring device to control the data storage medium, wherein
the maintenance terminal comprises second setting device for setting an allowable delay time for the random read, and wherein
the random read response delay monitoring device in the data storage device is adapted to monitor the presence of delay in response based on a second allowable delay time set by the second setting device.

14. The data storage system according to claim 13, wherein the second allowable delay time is shorter than a command timeout value.

15. The data storage system according to claim 13, wherein the command issue control device is adapted to issue an initial command of Ordered Queue Task Attribute.

16. The data storage system according to claim 13, wherein the command issue control device is adapted to perform control of suspending additional command issue to the data storage medium until all commands issued are completed.

17. A data storage system comprising:

a host computer;

a data storage device made to communicate with the host computer via a network to store data from the host computer into a data storage medium; and a maintenance terminal made to communicate with the data storage device via the network, wherein the data storage device comprises:

command response delay monitoring device for monitoring the presence of delay in response to command information for the data storage medium based on whether or not the response time to the command information exceeds an allowable delay time for the data storage medium; and command issue control device for newly issuing an initial command defining a certain order after passing the allowable delay time based on a result of monitoring the presence of delay in response obtained in the command response delay monitoring device to control the data storage medium, wherein the maintenance terminal comprises first setting device for setting an allowable delay time for the data storage medium, wherein the command response delay monitoring device in the data storage device is adapted to monitor the presence of delay in response based on a first allowable delay time set by the first setting device, and wherein the random read response delay monitoring device comprises:

request address history information storing device for storing history information of request addresses of read commands issued to the data storage medium;

access type analyzing device adapted to refer to the history information of the request addresses in the request address history information storing device for addresses of previously issued commands and to detect a sequential access if the command to be issued currently follows the last issued command, while analyzing the access as a random access and detecting a random read access to the data storage medium if the command to be issued currently does not follow the last issued command;

random read access command issue time storing device for storing the issue time of a random read access command if detected by the access type analyzing device; and random read access command response time determining device adapted to determine that there is a random read response delay from the data storage medium if the response to the random read access command is not completed even after a preset allowable random read delay time for the data storage medium.

18. The data storage system according to claim 17, wherein the first allowable delay time is shorter than a command timeout value.

19. A control method for a data storage device including at least one HDD, comprising:

monitoring the presence of delay in response to command information for the HDD based on whether or not the response time to the command information exceeds an allowable delay time for the HDD; and newly issuing an initial command defining a certain order after passing the allowable delay time for the HDD based on a result of monitoring the presence of delay in response obtained in a command response delay monitoring step to control the HDD, wherein the allowable delay time is shorter than a command timeout value.

20. The control method for a data storage device according to claim 19, wherein the command issue control step is adapted to issue an initial command of Ordered Queue Task Attribute.

21. The control method for a data storage device according to claim 19, wherein the command issue control step is adapted to perform control of suspending additional command issue to the HDD until all commands issued are completed.

22. A control method for a data storage device including at least one HDD, comprising:

monitoring the presence of delay in response to random read for the HDD based on whether or not the response time to the random read command exceeds an allowable delay time for the random read;

newly issuing an initial command defining a certain order after passing the allowable delay time for the random read based on a result of monitoring the presence of delay in response obtained in a random read response delay monitoring step to control the HDD, storing history information of request addresses of read commands issued to the HDD;

referring to the history information for addresses of previously issued commands and detecting a sequential access if the command to be issued currently follows the last issued command, while analyzing the access as a random access if the command to be issued currently does not follow the last issued command;

storing the issue time of a random read access command if detected; and determining that there is a random read response delay from the HDD if the response to the random read access command is not completed even after exceeding a preset allowable random read delay time for the HDD.

23. A non-transitory computer readable medium having a control program for a data storage device including at least one HDD, the program adapted to cause a computer to execute the functions of:

monitoring the presence of delay in response to command information for the HDD based on whether or not the response time to the command information exceeds an allowable delay time for the HDD;

newly issuing an initial command defining a certain order after passing the allowable delay time based on a result of monitoring the presence of delay in response obtained in a command response delay monitoring device to control the HDD; and monitoring the presence of delay in response based on the allowable delay time for the HDD wherein the allowable delay time is shorter than a command timeout value.

24. The non-transistory computer readable medium according to claim 23, adapted to cause a computer to execute a further function of monitoring the presence of delay in response based on the allowable delay time for the random read.

25. The control non-transitory computer readable medium according to claim 23, adapted to cause a computer to execute a further function of issuing an initial command of Ordered Queue Task Attribute.

26. The non-transitory computer readable medium according to claim 23, adapted to cause a computer to perform control of suspending additional command issue to a replicated data storage area until all commands issued are completed.

* * * * *